June 11, 1940.  G. MUSAPHIA  2,204,435
ANIMATED DISPLAY APPARATUS
Filed Sept. 12, 1938  2 Sheets-Sheet 1
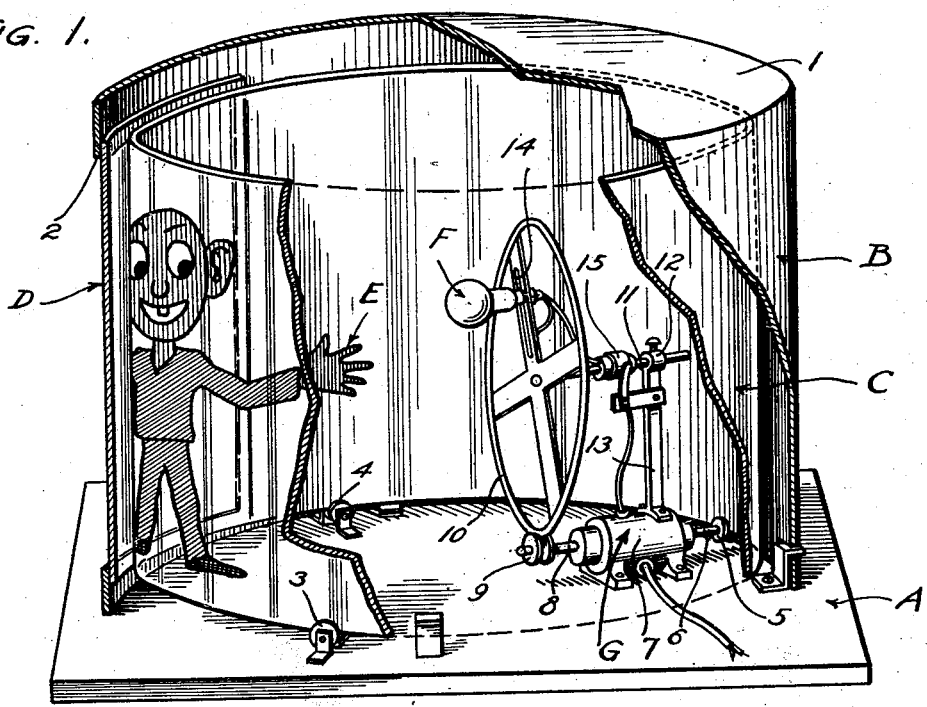
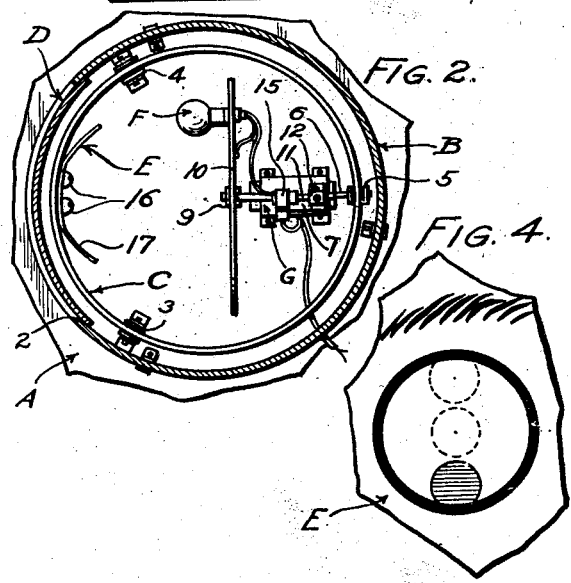
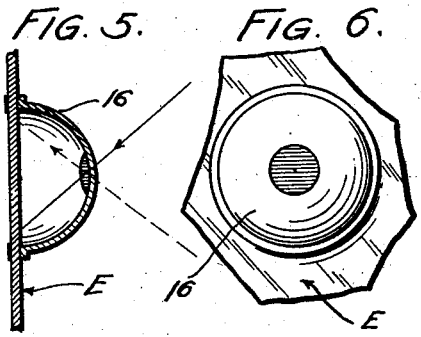
Inventor
GEORGES MUSAPHIA
Attorney.

June 11, 1940. G. MUSAPHIA 2,204,435
ANIMATED DISPLAY APPARATUS
Filed Sept. 12, 1938 2 Sheets-Sheet 2

Inventor
GEORGES MUSAPHIA
Attorney

Patented June 11, 1940

2,204,435

UNITED STATES PATENT OFFICE 2,204,435

ANIMATED DISPLAY APPARATUS

Georges Musaphia, Los Angeles, Calif., assignor to Animatagraph Corporation Limited, Charlottetown, Prince Edward Island, Canada, a corporation of Canada Application September 12, 1938, Serial No. 229,539

10 Claims. (Cl. 40—132)

This invention relates to an apparatus for creating animated effects for advertising and other purposes and deals primarily with improvements in display apparatus and methods which form the subject matter of my applications for patent respectively identified by Serial Nos. 116,519 and 116,520, and filed December 18, 1936.

A primary object of this invention is to provide a display apparatus which may be operated to create realistic and unique animated effects with comparatively few inexpensive parts and elements in a simple and compact arrangement, wherein the display subject may be quickly and easily changed without requiring the disassembling of the entire apparatus.

Another object of this invention is to provide a display apparatus of the character described wherein a figure for creating an animated effect is supported by a light penetrable carrier in such relation thereto that upon movement of the carrier relative to a moving light disposed behind the carrier there will be created a pronounced and unique animated effect or image which will be visible from in front of the carrier.

In accordance with this invention, the carrier may be the medium for displaying the animated image or the image may be displayed on a translucent or other suitable screen arranged in front of the carrier. Moreover, the invention contemplates the use of a translucent or partly translucent or otherwise light penetrable object or figure which may or may not be treated with fluorescent materials or coatings or colored in a fanciful manner so as to display the animated effects in colors or otherwise. In some instances I may use a light of a given wave length, such as from an ultra-violet lamp, whereby to excite the fluorescent coating or material on the figure. I have found that by moving a light penetrable carrier with a figure thereon such as hereinbefore described, across, relative to, or with a beam of light from a source which is rotated or otherwise moved in a circuitous or other path, a pronounced and realistic animated effect will be produced and made visible from in front of the carrier. This is preferably accomplished with the use of a translucent or otherwise light penetrable screen arranged in front of the carrier but the carrier, if translucent, may be used as a screen as well as a medium for supporting the moving figure.

I have shown in the accompanying drawings a preferred form of animated display apparatus embodying my invention, subject, however, to modification, within the scope of the appended claims, without departing from the spirit of my invention.

Referring to the drawings:

Fig. 1 represents a fragmentary perspective view of display apparatus constructed in accordance with this invention;

Fig. 2 represents a horizontal sectional view taken thru the device as shown in Fig. 1;

Fig. 3 represents a side elevation of a variational form of apparatus wherein the casing is in the shape of a crown;

Fig. 4 represents an enlarged elevational view of one of the eye portions of the figure;

Fig. 5 represents a sectional view of the eye portion;

Fig. 6 represents a rear elevation of the eye portion;

Figure 7:
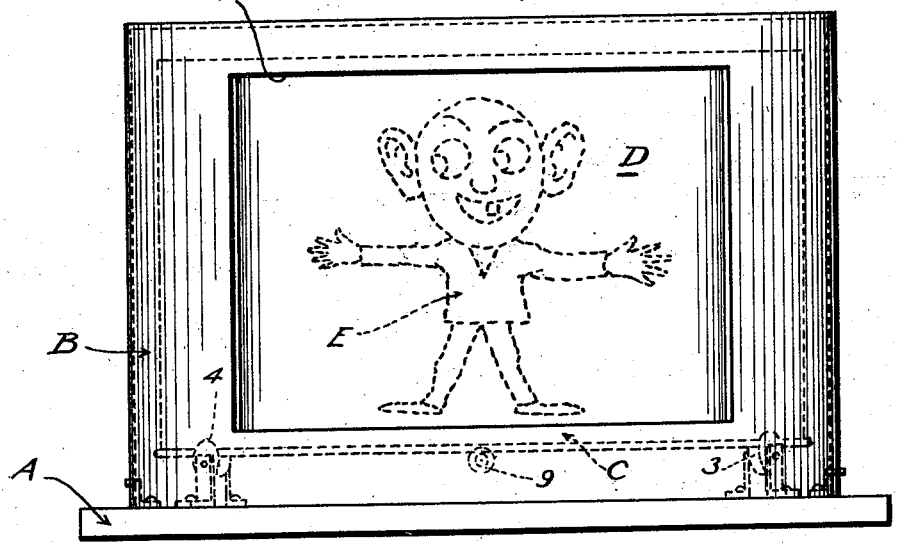
Fig. 7 represents a front elevation of the display apparatus of this invention.

One embodiment of the invention, as shown in the accompanying drawings, generally comprises a cabinet-like structure made up of a base A, a casing B, a carrier C rotatable within the casing, a translucent screen D formed as a part of the casing B, a figure E supported by the carrier, a movable light source F, and a means G for moving the light and also rotating the carrier.

The casing B is here shown as cylindrical but may be of any other shape, as for example, in the form of a crown as shown in Fig. 3, and while shown as having an integral upper wall 1, may obviously be closed by a removable lid or any other similar means. The screen D may be made of any suitable translucent material and is in the form of a sheet covering an opening 2 formed in the cylindrical wall of the casing B.

The carrier C may be made of any suitable translucent or other light penetrable material, or may be transparent, and is constructed as an open-ended cylinder arranged to rotate on a vertical axis so that the figure E mounted on the inner face thereof will be moved past the screen D, whereupon the latter will display the image of the figure. This carrier is supported on a plurality of flanged rollers 3, 4, and 5, of which the ones 3 and 4 are mounted on the base A, and the one 5 is fixed to the shaft 6 of the motor 7 also mounted on the base. The lower edge of the carrier is rested on these rollers and as the one 5 is rotated it is seen that the carrier will likewise be rotated about a vertical axis passing clear of but close to the rear face of the screen D. With this arrangement it is seen that it is only necessary to lift the carrier bodily from the case or to lift the case in order to gain access to the carrier for the purpose of substituting another carrier having a different subject of display.

The motor 7 is also provided with a shaft 8 which drives a pulley 9 disposed in contact with a light-supporting wheel 10 whereby to rotate the latter. This wheel is mounted on a horizontal shaft 11 supported in a bearing 12 on the upper end of a standard 13 fixed to the motor 7. The source of light F is adjustably supported as at 14 upon one side of the center of the wheel 10, and upon rotation of the latter the light will traverse a circuitous path. A suitable collector 15 provides for conveying current to the light. It is thus seen that the motor 7 serves the double purpose of rotating the carrier C and the light F. Since the carrier is rotated between the light and the screen, an image of the figure E will be revealed upon the screen in animated effect due to the rotation of the carrier and the consequent movement of the image therewith and also to the rotation of the light.

The animated effect is enhanced by having the figure E provided with portions which are offset from the plane of the remainder thereof; for example: eye or cheek portions 16 as shown in Figs. 4, 5, 6, and 10 are provided in the form of protuberances. Other portions of the figure, depending upon the subject it depicts, may be offset in this manner to enhance the animated effect. Such other portions are indicated at 17 in Fig. 2 and may constitute the limbs of a human figure. Preferably the figure is cemented or otherwise fixed to the inner face of the carrier so that it will move across and behind the screen upon rotation of the carrier. However, the figure may be arranged to be otherwise supported and will produce the desired effect as long as it is adjacent the carrier and between it and the source of light. It is seen that, due to the movement of the figure and the rapidly changing directions of the light beams from the moving light, an animated effect, such as rolling of the eyes and waving of the arms, or smiling of a human being, will be created.

It is thus seen that the moving of the source of light as well as the figure behind the screen will produce effects which are much more pronounced as to animation and realism than where the light is stationary and the carrier is moved, or vice versa.

The figure may be fluorescent, as by coating the same with fluorescent materials or otherwise treating it, and in such case a light of given wave length best calculated to excite the fluorescent material is used, such as, for example, an ultra-violet light. Preferably, the figure is translucent or otherwise light penetrable so that an image thereof will be created rather than a shadow, which latter would be the result if the figure were opaque.

Figure 8:
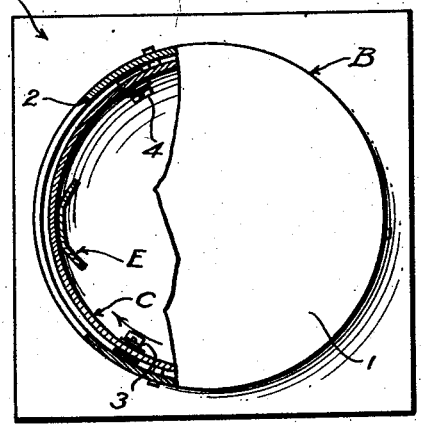
Fig. 8 represents a fragmentary top plan view of a modified form of the invention.
Figure 11:
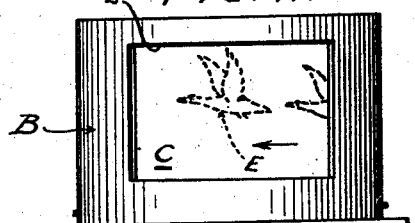
Fig. 11 is a front elevation of the modified form shown in Fig. 8.

I may eliminate the screen D, as shown in Figs. 8 and 11. In this modification the parts and elements are arranged and operated in the same manner as in the other form of the invention and the same reference numerals are used. However, in order to eliminate the screen it is necessary that the carrier be translucent so that the operating parts will not be visible. In operating this form of the invention the animated image will appear, for example, as shown in Fig. 11, the figures being fastened to the back of the carrier and the image appearing on the carrier itself and visible from in front thereof.

Figure 9:
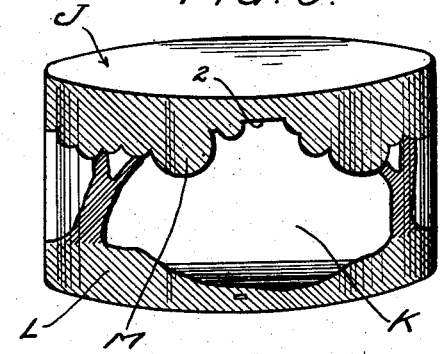
Fig. 9 represents a perspective view of another modified form.
Figure 10:
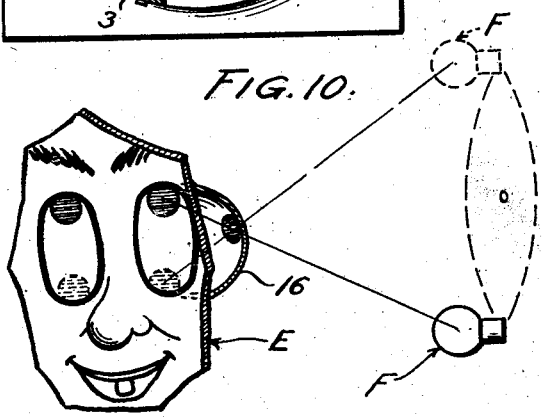
Fig. 10 is a schematic view showing the manner in which the animated effect is obtained.

As shown in Fig. 3, the casing may be in the form of a crown H and, in fact, any desired shape may be employed for decorative or other purposes. In Fig. 9 the casing J is provided with a translucent screen A and also provided with scenic effects as at L and M. Otherwise the operating mechanism is the same as in the first described form of the invention.

It should be noted that the light F may be variously positioned on the wheel 10 by means of the adjustment provisions shown at 14. When the light is in different positions on the wheel the movement effects given the image will be varied, such that either a large or a small movement of a part of the image or the whole thereof may be provided as desired.

It should be noted that the apparatus of this invention will readily lend itself to portable constructions such as particularly adapted for use in store windows and similar display places, and that because of the cylindrical form of the carrier a great number of different subjects and a great variety of animated effects may be produced.

I claim:

1. An apparatus for creating animated effects including a source of light, means for moving said source of light in a fixed path, a light penetrable carrier arranged so that rays from said light will pass therethru, a translucent figure supported by said carrier between the carrier and the source of light, and means for moving the carrier and figure thereon while light rays from said source of light are directed thereon.

2. An apparatus for creating animated effects including a translucent screen, a source of light rearwardly thereof, means for moving said source of light in a predetermined path, a light penetrable carrier spaced from and disposed between said source of light in said screen, a translucent figure supported by said carrier in the path of light rays emanating from said source, and means for moving the carrier relative to said source of light for producing on the screen an animated image of the figure.

3. An apparatus for creating animated effects including a translucent screen, a source of light rearwardly thereof, means for moving said source of light in a predetermined path, a light penetrable carrier spaced from and disposed between said source of light in said screen, a translucent figure supported by said carrier in the path of light rays emanating from said source, and means for moving the carrier relative to said source of light for producing on the screen an animated image of the figure, said figure having a portion extended from the plane of the remainder thereof.

4. An apparatus for creating animated effects including a light penetrable carrier rotatable about a vertical axis, a source of light rotatable about a horizontal axis, a translucent figure supported by said carrier and disposed between the carrier and the source of light, and means for simultaneously moving the source of light and said carrier.

5. An apparatus for creating animated effects including a light penetrable carrier, a source of light, a translucent figure supported by said carrier and disposed between the carrier and the source of light, and means for simultaneously moving the source of light and said carrier in different predetermined paths about angularly related axes.

6. An apparatus for creating animated effects including a light penetrable carrier, a source of light, a translucent figure supported by said carrier and disposed between the carrier and the source of light, and means for simultaneously moving the source of light and said carrier with said light source describing a circuitous path about a horizontal axis and the carrier moving on a vertical axis.

7. An apparatus for creating animated effects including a substantially cylindrical carrier mounted for rotation on a vertical axis, a source of light mounted within the confines of the carrier in spaced relation thereto for movement in a circuitous path upon a horizontal axis, a translucent figure supported by the carrier between it and the source of light, and means for simultaneously moving said source of light and said carrier.

8. An apparatus for creating animated effects including a substantially cylindrical carrier mounted for rotation on a vertical axis, a source of light mounted within the confines of the carrier in spaced relation thereto for movement in a circuitous path upon a horizontal axis, a translucent figure supported by the carrier between it and the source of light, and means for simultaneously moving said source of light and said carrier, said figure having a portion thereof extended toward said light source and out of the plane of the remainder thereof.

9. An apparatus for creating animated effects including a substantially cylindrical carrier mounted for rotation on a vertical axis, a source of light mounted within the confines of the carrier in spaced relation thereto for movement in a circuitous path upon a horizontal axis, a translucent figure supported by the carrier between it and the source of light, means for simultaneously moving said source of light and said carrier, and a translucent screen disposed in front of the carrier for producing an image of the figure.

10. An apparatus for creating animated effects including a substantially cylindrical carrier mounted for rotation on a vertical axis, a source of light mounted within the confines of the carrier in spaced relation thereto for movement in a circuitous path upon a horizontal axis, a translucent figure supported by the carrier between it and the source of light, means for simultaneously moving said source of light and said carrier, and a translucent screen disposed in front of the carrier for producing an image of the figure, said means for moving said carrier including rollers engaging the lower edge of the carrier, and a motor for driving one of said rollers.

GEORGES MUSAPHIA.